March 9, 1965  J. GLASER  3,172,689
SHAFT ATTACHMENT APPARATUS
Filed April 30, 1962

INVENTOR:
JERRY GLASER,
BY
Attorney.

3,172,689
SHAFT ATTACHMENT APPARATUS
Jerry Glaser, Los Angeles, Calif., assignor to The Garrett Corporation, Los Angeles, Calif., a corporation of California
Filed Apr. 30, 1962, Ser. No. 191,155
5 Claims. (Cl. 287—53)

This invention relates to shaft attachment apparatus for high temperature rotating machinery and in particular relates to shaft bushing structure capable of compensating for differences in the rates of expansion for shaft bushing structure and rotor structure so as to obviate effects such as loss of concentricity between these two structures.

In high temperature rotating machinery, as in an electric motor for example, shaft bushing structure must be capable of high temperature operation. The high temperature operation may be in the vicinity of 1000° F. In this type of high temperature rotating machinery it may be desired to use dry journal bearings. A difference in the rates of expansion for the shaft bushing structure and the rotor structure can produce a loss of concentricity between these structures. Such a loss of concentricity can cause high unbalance loads and other undesirable effects.

Accordingly, it is an object of this invention to provide shaft attachment apparatus capable of compensating for differences in the rates of expansion for shaft bushing structure and other structure within high temperature rotating machinery.

Another object of this invention is to provide apparatus which will obviate effects such as loss of concentricity between shaft bushing structure and rotor structure which could result in high unbalanced loads and other undesirable effects.

A further object of this invention is to provide shaft attachment apparatus capable of maintaining close contact with rotor structure and other rotating parts within high temperature operating machinery so as to prevent the shaft bushing structure from canting or shifting its position in relation to rotor structure.

Figure 1:
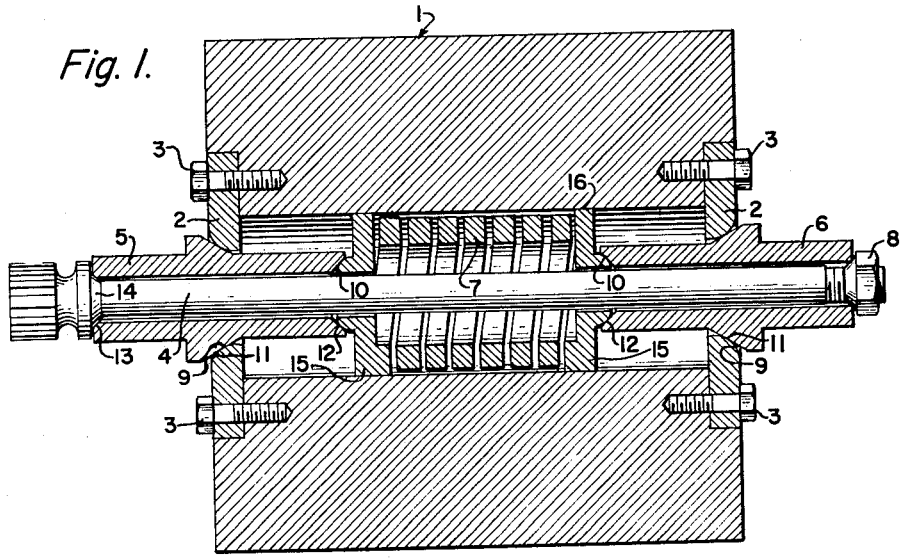
Figure 2:
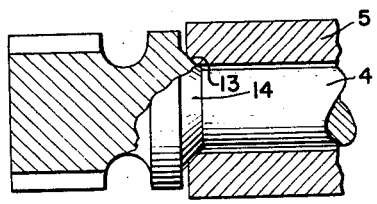

That these and other objects and advantages of the invention are obtained will be readily apparent from a consideration of the following description when taken in conjunction with the drawings, in which:

FIGURE 1 is a sectional view taken through the center of the rotor, shaft bushing structure, and central shaft within high temperature rotating machinery; and FIGURE 2 is a detailed sectional view on an enlarged scale of the left hand end of the central shaft and shaft bushing structure.

Referring to FIG. 1 of the drawings there is illustrated a rotor element 1 for a high temperature rotating machine. A plate member 2, made from the same material as rotor 1, is attached to rotor 1 by means of a plurality of bolts 3. A shaft member 4 extends through rotor 1 along the rotor center line. Shaft bushing members 5 and 6 are positioned concentrically upon and at opposite ends of member 4. Bushing members 5 and 6 are made from material having a coefficient of expansion which differs from the coefficient of expansion of material used in rotor member 1 and plate member 2. The material used for shaft member 4 may be tungsten carbide or the like.

In FIG. 1 a spring 7 is shown as being positioned intermediate shaft bushing members 5 and 6. Spring force from spring member 7 is exerted against members 5 and 6 in an outwardly direction toward the extremities of shaft 4. Shaft bushing members 5 and 6, and spring 7 are secured to shaft 4 by means of a nut 8. Shaft bushing members 5 and 6 have tapered portions, designated 9 and 10 in FIG. 1, which engage rounded portions 11 and 12 on plate member 2 and spring 7 respectively. In FIG. 2 it is seen that the tapered portion on shaft bushing member 5 engages tapered portion 14 on shaft member 4. FIG. 2 is representative of the tapered shaft and bushing structure existing on both extremities of shaft member 4.

As rotor 1 and shaft 4 expand axially with increased heat, spring 7 exerts a force in an outward direction on bushing members 5 and 6 so as to maintain these members in proper alignment in relation to rotor 1. Spring 7 may be constructed from the same material as used in both rotor 1 and shaft 4. Alternatively, spring 7 may abut upon collar members 15, which may act as extensions of spring 7. If collar members 15 are utilized they will be made from the same material as used in members 1 and 4. Thus, the rate of expansion of spring 7 will be the same as that of members 1 and 4, or alternatively, if collar members 15 are utilized they will have the same rate of expansion as that of members 1 and 4. In the latter event spring 7 may be made from a material having any desired coefficient of expansion.

As shown in FIG. 1 by reference character 16 a close fit is maintained between spring 7 and rotor 1 or between collars 15 and rotor 1. The close fit shown at 16 prevents spring 7 from canting or shifting its position on shaft 4. Additionally, it is to be noted that the force exerted by spring 7 on members 5 and 6 prevents members 5 and 6 from canting or shifting their position in relation to rotor 1.

As members 1, 4 and 7 expand radially with increased heat, line contact between surfaces 9 and 11 and between surfaces 10 and 12 is maintained so as to continuously position rotor 1 in proper alignment with other units within the high temperature rotating machinery. Line contact is a term used to indicate the manner in which a point on tapered surfaces 9 and 10 tangentially engages a corresponding point on surfaces 11 and 12 respectively. Surfaces 11 and 12 are rounded so that line contact may be maintained between surfaces 9 and 11 and also between surfaces 10 and 12. The line contact established between surface 9 and 11 and surface 10 and 12 facilitates the maintenance of rotor 1 in a proper position of alignment for the efficient operation of the high temperature rotating machinery.

It will be apparent to those skilled in this art that the novel principles of the invention disclosed herein will suggest various other modifications and applications of the same. It is accordingly desired that the present invention shall not be limited to the specific embodiment thereof described herein.

Having thus described my invention, I claim:

1. Shaft attachment apparatus for supporting rotor structure within high temperature rotating machinery, said apparatus comprising:
 means concentric with said shaft for providing shaft bushing structure, said concentric means being made from material having a coefficient of expansion different from that of material used in said shaft for said rotating machinery;
 means for establishing line contact between said bushing structure means and said rotor structure; and
 means for continuously positioning said bushing structure means on said shaft so as to maintain proper rotor alignment under varying heat conditions within said rotating machinery.

2. Shaft attachment apparatus for supporting rotor structure within high temperature rotating machinery, said apparatus comprising:
 means concentric with said shaft for providing shaft bushing structure;
 means for establishing contact points between said bushing means and said rotor structure;
 said bushing means being made from material having a coefficient of expansion different from that of materials utilized in said shaft for said rotating machinery;

and resilient means for continuously positioning said bushing means on said shaft so as to maintain proper rotor alignment under varying heat conditions within said rotating machinery;

said positioning means being made from the same material as utilized in said rotor and shaft structure.

3. Shaft attachment apparatus for supporting rotor structure within high temperature rotating machinery, said apparatus comprising:

first and second shaft bushing members located at opposite ends of said shaft, said bushing members being made from material having a coefficient of expansion different from that of material used in said shaft for said rotating machinery;

tapered portions on said bushing members for contacting said rotor structure;

and resilient means intermediate said bushing members for exerting a force on said bushing members so as to continuously maintain proper rotor alignment under varying heat conditions within said rotating machinery.

4. Shaft attachment apparatus for supporting rotor structure within high temperature rotating machinery, said apparatus comprising:

first and second shaft bushing members located at opposite ends of said shaft;

tapered portions on said bushing members for contacting said rotor structure;

resilient means intermediate said bushing members;

tapered portions on said bushing members for contacting said resilient means;

rounded portions on said resilient means for contacting said bushing members;

said resilient means exerting a force on said bushing members so as to continuously maintain proper rotor alignment under varying heat conditions within said rotating machinery.

5. Shaft attachment apparatus for supporting rotor structure within high temperature rotating machinery, said apparatus comprising:

first and second shaft bushing members located at opposite ends of said shaft;

tapered portions on said bushing members for contacting said rotor structure;

resilient means intermediate said bushing members;

tapered portions on said bushing members for contacting said resilient means;

rounded portions on said resilient means for contacting said bushing members;

said resilient means exerting a force on said bushing members so as to continuously maintain proper rotor alignment under varying heat conditions within said rotating machinery;

means on opposite ends of said shaft for securing said bushing members to said shaft;

said bushing members having tapered portions for contacting said securing means;

said securing means having tapered portions for contacting said bushing members; and one of said securing means being adjustable so as to vary the position of said bushing members on said shaft.

References Cited in the file of this patent

UNITED STATES PATENTS

| 2,213,432 | McCartney | Sept. 3, 1940 |
| 2,270,392 | Talmage et al. | Jan. 20, 1942 |
| 2,443,688 | McFarland | June 22, 1948 |

FOREIGN PATENTS

| 483,178 | Germany | Sept. 30, 1929 |